United States Patent
Chou et al.

(10) Patent No.: US 7,277,420 B2
(45) Date of Patent: Oct. 2, 2007

(54) TEMPORAL ALIGNMENT OF CODEC DATA WITH WIRELESS LOCAL AREA NETWORK RF SLOTS

(75) Inventors: Vivian Chou, Alhambra, CA (US); Charles Aragones, Los Angeles, CA (US); Sherman Lee, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 1064 days.

(21) Appl. No.: 10/293,452

(22) Filed: Nov. 13, 2002

(65) Prior Publication Data

US 2003/0152057 A1    Aug. 14, 2003

Related U.S. Application Data

(60) Provisional application No. 60/394,326, filed on Jul. 8, 2002, provisional application No. 60/356,323, filed on Feb. 12, 2002.

(51) Int. Cl.
*H04J 3/06* (2006.01)

(52) U.S. Cl. .................. 370/350; 455/41.2; 455/550.1; 455/553.1; 370/338; 375/242

(58) Field of Classification Search ................ 370/338, 370/351, 503, 350; 455/41.2, 550.2, 552.1, 455/553.1; 375/242, 219, 220; 704/212; 341/50, 126

See application file for complete search history.

(56) References Cited

U.S. PATENT DOCUMENTS

| | | | |
|---|---|---|---|
| 5,172,396 A | | 12/1992 | Rose, Jr. et al. |
| 5,208,810 A | | 5/1993 | Park |
| 5,959,982 A | * | 9/1999 | Federkins et al. .......... 370/336 |
| 5,978,688 A | * | 11/1999 | Mullins et al. ............. 455/557 |
| 6,574,281 B1 | * | 6/2003 | Yoshida et al. ............. 375/244 |
| 6,707,825 B1 | * | 3/2004 | Turner et al. ............... 370/467 |
| 6,768,776 B1 | * | 7/2004 | Mullins et al. ............. 375/244 |
| 7,164,662 B2 | * | 1/2007 | Preston et al. .............. 370/328 |

(Continued)

FOREIGN PATENT DOCUMENTS

EP    1 017 197 A2    7/2000

(Continued)

*Primary Examiner*—Rafael Perez-Gutierrez
*Assistant Examiner*—Olumide Ajibade-Akonai
(74) *Attorney, Agent, or Firm*—Garlick Harrison & Markison; Bruce E. Garlick

(57) ABSTRACT

A wireless local area network (WLAN) transceiving integrated circuit services voice communications in a WLAN with at least one other WLAN device. The WLAN transceiving integrated circuit includes a WLAN interface, an input buffer, a transcoder, and a processor. The WLAN interface wirelessly communicates with the at least one WLAN device to receive packetized audio data from the at least one WLAN device. The input buffer operably couples to the WLAN interface and receives the packetized audio data from the WLAN interface. The transcoder operably couples to the input buffer and receives the packetized audio data from the input buffer. The transcoder converts the packetized audio data to Pulse Code Modulated (PCM) audio data and outputs the PCM audio data to a coupled audio COder/DECoder (CODEC). The processor operably couples to the WLAN interface, the input buffer, and the transcoder. The transcoder outputs the PCM audio data to the audio CODEC such that the PCM audio data is substantially temporally aligned with Radio Frequency (RF) slots of the WLAN interface.

33 Claims, 12 Drawing Sheets

U.S. PATENT DOCUMENTS

2004/0119619 A1* 6/2004 Lambert .................. 341/108

FOREIGN PATENT DOCUMENTS

| EP | 1 119 137 A1 | 7/2001 |
| EP | 1 146 691 A1 | 10/2001 |
| WO | WO 01/63950 A1 | 8/2001 |
| WO | WO 02/09363 A2 | 1/2002 |

* cited by examiner

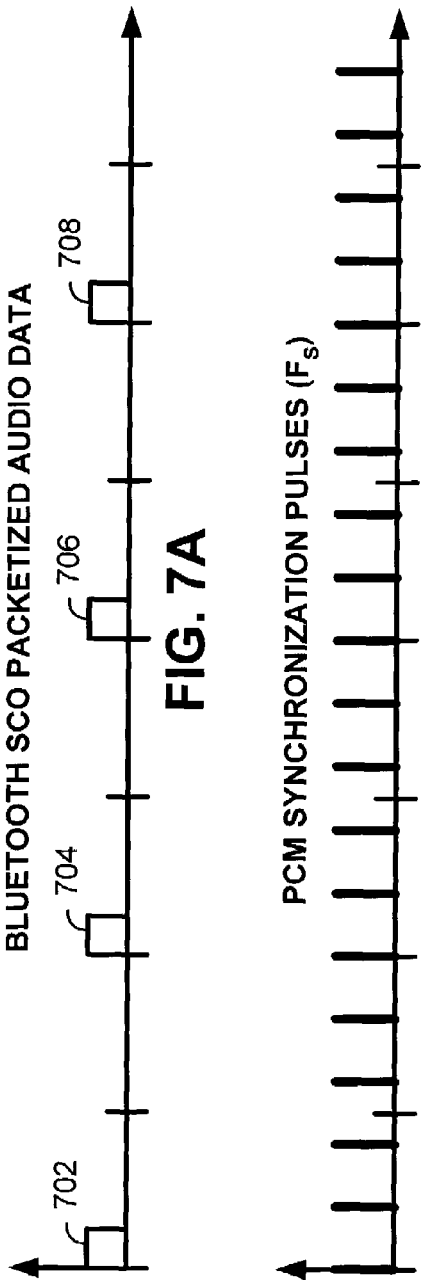
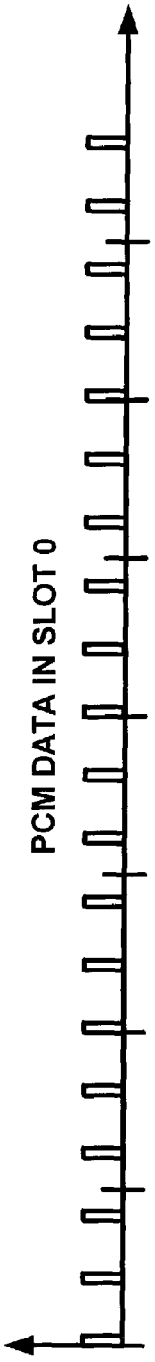
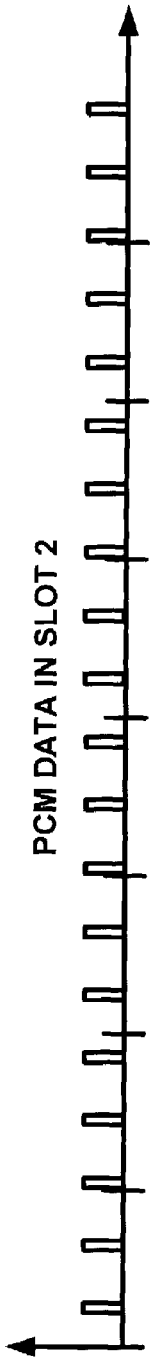
FIG. 7A BLUETOOTH SCO PACKETIZED AUDIO DATA
FIG. 7B PCM SYNCHRONIZATION PULSES ($F_s$)
FIG. 7C PCM DATA IN SLOT 0
FIG. 7D PCM DATA IN SLOT 2

TEMPORAL ALIGNMENT OF CODEC DATA WITH WIRELESS LOCAL AREA NETWORK RF SLOTS

CROSS REFERENCES TO RELATED APPLICATIONS

This application claims priority to U.S. Provisional Application Ser. No. 60/356,323, filed Feb. 12, 2002, and to U.S. Provisional Application Ser. No. 60/394,326, filed Jul. 8, 2002, the disclosure of both of which are incorporated herein by reference for all purposes.

FIELD OF THE INVENTION

The present invention relates to wireless communications; and more particularly to operations by a Wireless Local Area Network device.

BACKGROUND OF THE INVENTION

The number and popularity of wireless communications devices in use continues to rise rapidly all over the world. Not only have cellular telephones become very popular, but Wireless Local Area Networking (WLAN) devices have also proliferated. One standard for wireless networking, which has been widely accepted, is the Specification of the Bluetooth System, v. 1.1 ("Bluetooth Specification"). The Bluetooth Specification enables the creation of small personal area networks (PAN's), where the typical operating range of a device is 100 meters or less. In a Bluetooth system, Bluetooth devices sharing a common channel sequence form a piconet. Two or more piconets co-located in the same area, with or without inter-piconet communications, is known as a scatternet.

The Bluetooth Specification supports voice communications between Bluetooth enabled devices. When a pair of Bluetooth devices support voice communication, the voice communications must be wirelessly supported in a continuous fashion so that carried voice signals are of an acceptable quality. Unexpected gaps, e.g., dropped packets, on the wireless link between supported Bluetooth devices causes degradation in the voice communication resulting in popping, static, or other unpleasant audible event. This problem is especially troublesome with Bluetooth devices since, in some operations, the communication link will regularly drop packets that carry the voice signals.

A further shortcoming of such operations relates to the manner in which packetized audio data is transmitted between Bluetooth devices. Consider an operation in which a first Bluetooth device transmits packetized audio data to a second Bluetooth device for presentation to a user. Because the Bluetooth WLAN supports data rates greatly in excess of those required for satisfactory voice service, each transmission from the first Bluetooth device carries a relatively large amount of packetized audio data. The duration of this transmission is typically small compared to the duration over which the second Bluetooth device will present the packetized audio data (carried in the transmission) to the user. Thus, the second Bluetooth device buffers the received packetized audio data and presents the packetized audio data (in a converted form) over an appropriate time period. However, if the packetized audio data stored in the input buffer is fully consumed prior to receipt of another transmission from the first Bluetooth device, it will appear to the second Bluetooth device that packetized audio data is lost (or severely delayed), and the second Bluetooth device will provided degraded audio to the serviced user.

Thus, there is a need for improved operation by WLAN devices servicing voice communications.

SUMMARY OF THE INVENTION

In order to overcome the above-described shortcomings of the prior devices as well as other shortcomings, a wireless local area network (WLAN) transceiving integrated circuit constructed according to the present invention services voice communications in a WLAN with at least one other WLAN device. The WLAN transceiving integrated circuit, in one embodiment, is formed as a single monolithic integrated circuit. Herein, the terms "audio communications" and "voice communications" are both be used to refer to communications that contain information based upon audio signals that originate from or that are presented to a user in an audio format. Of course, the voice/audio communications need not be received directly from a human but may be generated by electronic equipment such as computers, media players, etc.

The WLAN transceiving integrated circuit includes a WLAN interface, an input buffer, a transcoder, and a processor. The WLAN interface wirelessly communicates with the at least one WLAN device to receive packetized audio data from the at least one WLAN device. The input buffer operably couples to the WLAN interface and receives the packetized audio data from the WLAN interface. The transcoder operably couples to the input buffer and receives the packetized audio data from the input buffer. The transcoder converts the packetized audio data to Pulse Code Modulated (PCM) audio data and outputs the PCM audio data to a coupled audio COder/DECoder (CODEC). The processor operably couples to the WLAN interface, the input buffer, and the transcoder. In the operation of the WLAN transceiving circuit, the transcoder outputs the PCM audio data to the audio CODEC such that the PCM audio data is substantially temporally aligned with Radio Frequency (RF) slots of the WLAN interface.

The packetized audio data may be in a format consistent with the Bluetooth Specification or with another standard, e.g., IEEE 802.11(a), IEEE 802.11(b), IEEE 802.11(c), etc. When the WLAN transceiving integrated circuit operates within a Bluetooth WLAN, the WLAN interface supports the Bluetooth Specification. In such case, a WLAN device transmitting to the WLAN transceiving integrated circuit may serve as a master Bluetooth device of the WLAN and dictate the timing of the RF slots of the WLAN interface. In this case, the timing of the master Bluetooth device may differ over time from the timing of the WLAN transceiving integrated circuit.

With the structure and operation of the WLAN transceiving integrated circuit of the present invention, the RF slots of the WLAN interface (that correspond to another WLAN device servicing as a master) are not synchronized to the WLAN transceiving integrated circuit. With prior devices, underflow of the input buffer could occur. However, according to the present invention the transcoder outputs the PCM audio data to the audio CODEC such that the PCM audio data is substantially temporally aligned with RF slots of the WLAN interface. Thus, with the present invention, the transcoder consumes the packetized audio data at the same rate as it is written into the input buffer by the WLAN interface. Thus, the PCM audio data that is output by the transcoder will not surge ahead of, or lag behind, the packetized audio data that is received by the WLAN interface and written to the input buffer (unless packetized audio data is lost in transit).

In one operation of the present invention, the processor controls the timing of the output of the PCM audio data by the transcoder. In such case, the processor may be a microsequencer that executes a plurality of microcode software instruction that causes the processor to exert such control over the transcoder. In one particular implementation, the processor provides a synchronization signal to the transcoder that is substantially temporally aligned with the RF slots of the WLAN interface. The transcoder then uses the synchronization signal to output the PCM audio data so that it is substantially temporally aligned with the RF slots of the WLAN interface.

The processor may monitor the temporal alignment of the synchronization signal and the RF slots of the WLAN interface. In such case, the processor adjusts a timing of the synchronization signal when a timing offset between the synchronization signal and a corresponding RF slot of the WLAN interface compares unfavorably to a timing offset threshold. In one or more embodiments of the WLAN transceiving integrated circuit, the synchronization signal is a stream of PCM synchronization pulses whose timing is controlled to align with the RF slots of the WLAN interface.

In another operation of the present invention, the WLAN interface provides a synchronization signal to the transcoder that is substantially temporally aligned with the RF slots of the WLAN interface. The transcoder then uses the synchronization signal to output the PCM audio data so that the PCM audio data is substantially temporally aligned with the RF slots of the WLAN interface. In this case, the processor does not directly participate in coordinating the timing between the synchronization signal and the RF slots of the WLAN interface.

According to still another aspect of the present invention, the transcoder produces a synchronization signal to the coupled audio CODEC that is substantially temporally aligned with the RF slots of the WLAN interface. The transcoder then produces the PCM audio data to the coupled audio CODEC such that it is substantially synchronized with the synchronization signal.

The WLAN transceiving integrated circuit may be constructed to include various additional components. For example, in one construct, the WLAN transceiving integrated circuit includes a CODEC. The CODEC operably couples to the transcoder and converts the PCM audio data to analog audio data. The CODEC couples to a speaker that receives the analog audio data and converts the analog audio data to an audio signal that is presented to a user.

The WLAN transceiving integrated circuit may couple to a microphone that receives an outbound audio signal from a user and that converts the outbound audio signal to an outbound analog audio signal. In this operation, the audio CODEC operably couples to the microphone that converts the outbound analog audio signal to outbound PCM audio data. The transcoder converts the outbound PCM audio data to outbound packetized audio data. The WLAN transceiving integrated circuit includes an output buffer that operably couples to the transcoder and to the WLAN interface. The output buffer receives the outbound packetized audio data from the transcoder and provides the outbound packetized audio data to the WLAN interface.

Thus, the WLAN transceiving integrated circuit of the present invention provides significant operational improvements over prior devices in gracefully servicing voice communications. Other features and advantages of the present invention will become apparent from the following detailed description of the invention made with reference to the accompanying drawings.

BRIEF DESCRIPTION OF THE DRAWINGS

FIG. 7A is a graph illustrating the timing of receipt of packetized audio data by the WLAN interface of the WLAN transceiving integrated circuit of the present invention;

FIGS. 7B through 7D are graphs illustrating the production of PCM synchronization pulses and PCM audio data by the transcoder of the PCM interface of the WLAN transceiving integrated circuit of the present invention;

DETAILED DESCRIPTION

Figure 1:
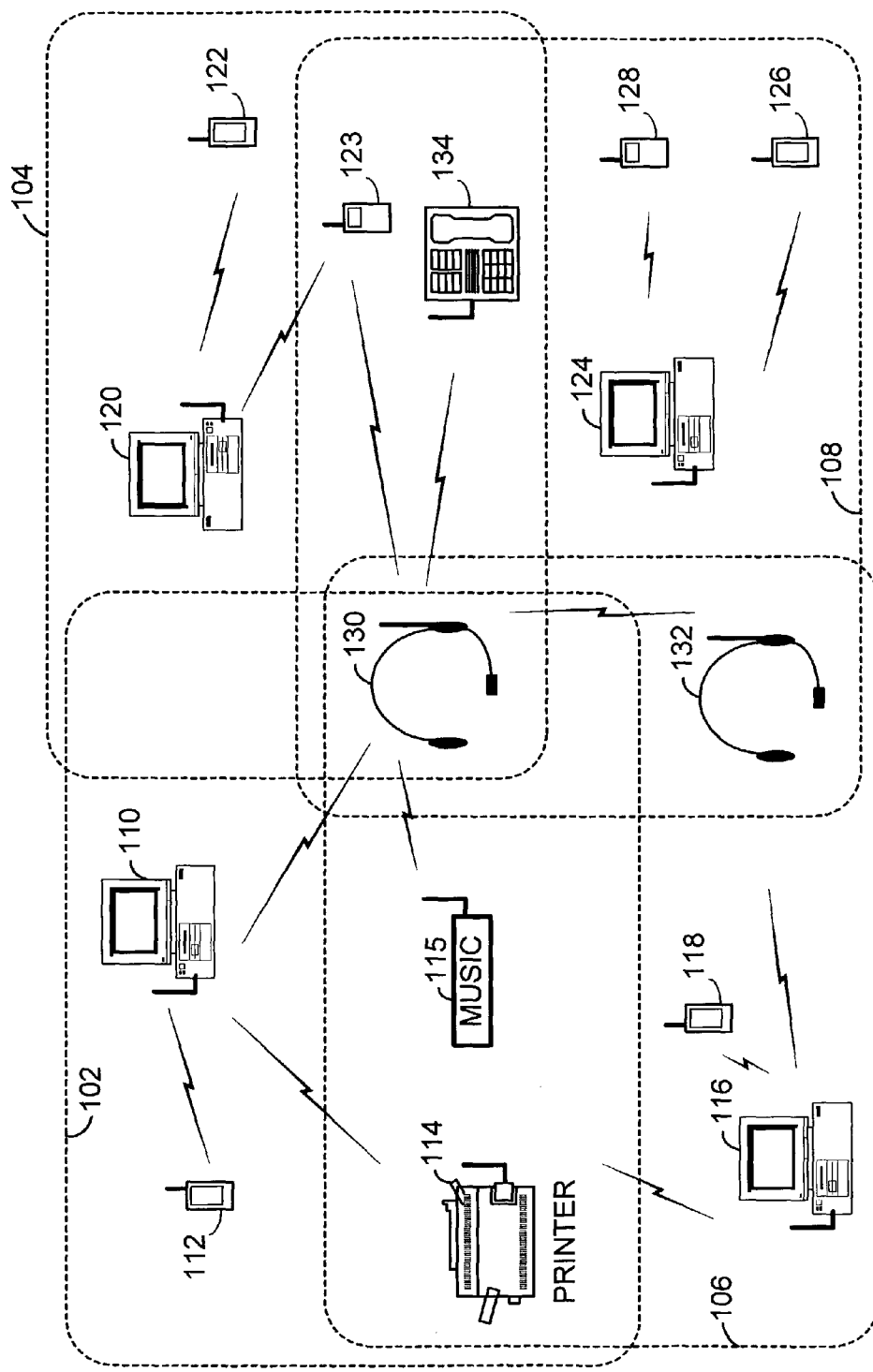
FIG. 1 is a system diagram illustrating a plurality of Wireless Local Area Network (WLAN) devices, some of which have installed therein WLAN transceiving integrated circuit constructed according to the present invention.

FIG. 1 is a system diagram illustrating a plurality of Wireless Local Area Network (WLAN) devices, some of which have installed therein WLAN transceiving integrated circuit constructed according to the present invention. Each of these WLAN devices supports one or more versions of the Bluetooth Specification. A Bluetooth "scatternet" is formed from multiple "piconets" with overlapping coverage. The scatternet of FIG. 1 includes four separate piconets 102, 104, 106, and 108. Piconet 102 includes master (computer) 110, slave 112 (PDA), slave 114 (printer), slave 130 (wireless headset), and slave 115 (music source). Piconet 104 includes master 120 (computer), slave 122 (PDA), slave 123 (wireless phone), slave 130 (wireless headset), and slave 134 (landline phone). Piconet 106 includes master (computer) 116, slave 118 (PDA), slave 114 (printer), slave 130 (wireless headset), and slave 132 (wireless headset). Piconet 108 includes master (computer) 124, slave 126 (PDA), slave 128 (wireless phone, e.g., WLAN phone, cell phone, etc.), slave 132 (wireless headset), and slave 130 (wireless headset). The four separate piconets 102, 104, 106, and 108 have overlapping coverage areas. In the embodiment of FIG. 1, all masters are shown to be computers because they will typically be stationary and have the processing capability to service a number of slaves. However, in other embodiments, the masters could be other devices as well. The scatternet of FIG. 1 may service a call center, customer service department, or other office environment, for example that benefits by the wireless interconnection of the illustrated devices.

A user of wireless headset 130 (or 132) may establish communications with any WLAN device in a piconet of which the wireless headset 130 (or 132) is also a member. The wireless headset 130 may have a minimal user interface, e.g., a single authenticate button that initiates joining of a piconet. However, the wireless headset 130, in its operating location, resides within the service coverage area of each of the four separate piconets 102, 104, 106, and 108 that form the scatternet. Thus, when the wireless headset 130 enters (or powers up in) an area with more than one functioning piconet, a user of the wireless headset 130 depresses an authenticate button to start the authentication process. With the authenticate button depressed, the wireless headset attempts to join one of piconets 102, 104, 106, and 108. Subsequent authentication operations are required to have the wireless headset join the selected piconet. These subsequent authentication operations may include prompting the user for selection of the piconet, requiring that entry be made on the home computer 110 to allow the wireless headset 130 to join the piconet 102, or other authentication operations. Likewise, the wireless headset 132 joins piconet 106 by performing appropriate authentication operations with master (computer 116) of piconet 106.

Once a wireless headset, e.g., 130 or 132 joins a respective piconet, 102 or 106, the wireless headset establishes an audio link with one or more of the members of the piconet via respective WLAN links. In particular, when the wireless headset 130 serves within a call center of FIG. 1, for example, an attendant using the wireless headset 130 services calls of the call center. Such calls will be received and managed by the computer 110 in the example. Likewise, the user of wireless headset 132 will work in conjunction with the computer 116 to service calls for the call center.

Each of the WLAN devices illustrated in FIG. 1 may include a WLAN transceiving integrated circuit constructed according to the present invention. As will be described further herein with reference to FIGS. 3A-10, the WLAN transceiving integrated circuit gracefully operates when RF slots of a transmitting WLAN device servicing as a master of a piconet are not synchronized with the other operations of the WLAN transceiving integrated circuit. According to the present invention, PCM audio data that is produced by the WLAN transceiving integrated circuit based upon received packetized audio data is substantially temporally aligned with RF slots of the transmitting WLAN device. Thus, with the present invention, the WLAN device at the same rate consumes packetized audio data as it is received from the transmitting WLAN device. Thus, the PCM audio data output does not surge ahead of, or lag behind, the packetized audio data that is received from the transmitting WLAN device.

Figure 2A:
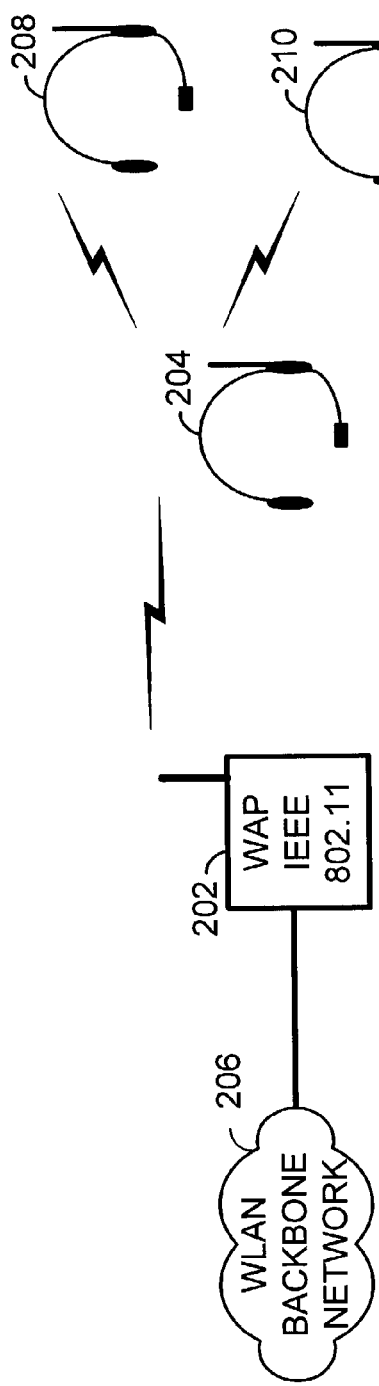
FIG. 2A is a system diagram illustrating the interaction between a plurality of WLAN devices constructed according to the present invention and a Wireless Access Point (WAP)

FIG. 2A is a system diagram illustrating the interaction between a plurality of WLAN devices 204, 208, and 210 constructed according to the present invention and a Wireless Access Point (WAP) 202. In the embodiment of FIG. 2A, the wireless headset 204 is Bluetooth compliant and/or IEEE 802.11 compliant, e.g., IEEE 802.11a, IEEE 802.11b, IEEE 802.11g, etc. In such case, the wireless headset 204 establishes a voice communication via the WAP 202 with another device also serviced by the WAP 202, or, more likely, with another device couple to the WAP 202 via the Wireless Local Area Network (WLAN) backbone network 206. Further, the wireless headset 204 services voice communications with two additional wireless headsets 208 and 210.

Figure 2B:
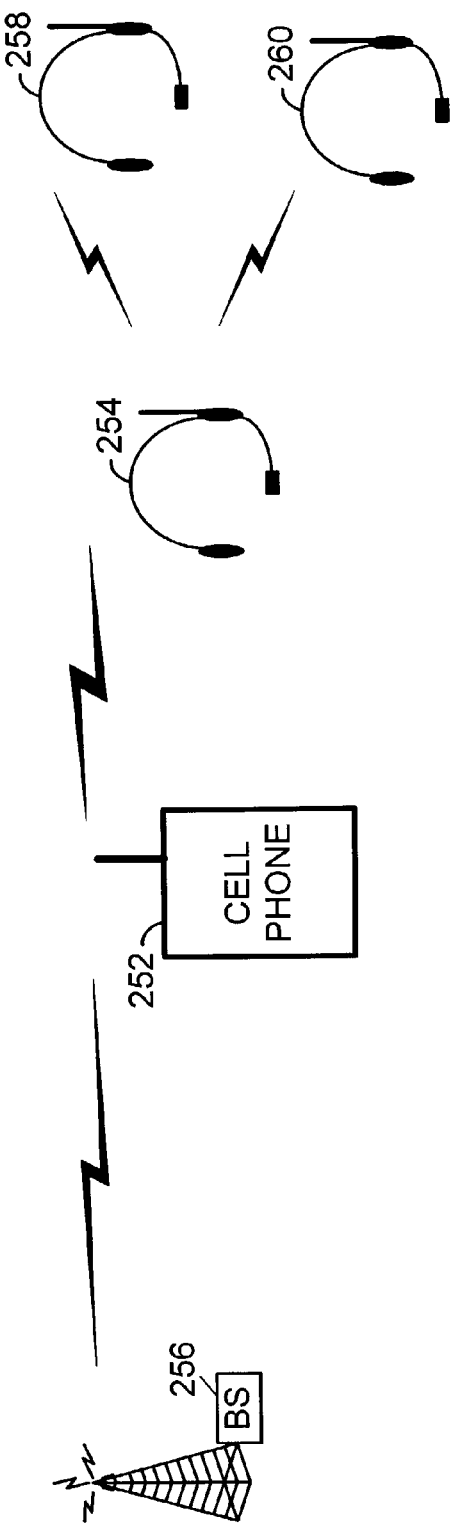
FIG. 2B is a system diagram illustrating the interaction between wireless headsets, a cell phone, and a cellular base station according to the present invention.

FIG. 2B is a system diagram illustrating the interaction between wireless headsets 254, 258, and 260, a cell phone 252, and a cellular base station 256. The cell phone 252 establishes a cellular telephone call via the base station 256 with another wireless device or with a wired device that couples to the base station 256 via a wired connection. The cell phone 252 operates according to a cellular operating standard, e.g., IS-95A, IS-95B, IS-136, GSM, 1xRTT, 1xEV, UMTS, etc. The cell phone 252 also supports the Bluetooth specification and communications with the wireless headset 254 via Bluetooth operations. The wireless headset 254 supports communications with wireless headsets 258 and 260 also via the Bluetooth operations. Thus, for example, the user of the wireless headset 254, while operating a vehicle may use the wireless headset 254 for audio communications serviced by the cell phone 252. However, usage of the components of FIG. 2B is not limited to a vehicular application. Further, in order to support call conferencing, the wireless headset 254 supports conferencing with wireless headsets 258 and 260.

Figure 3A:
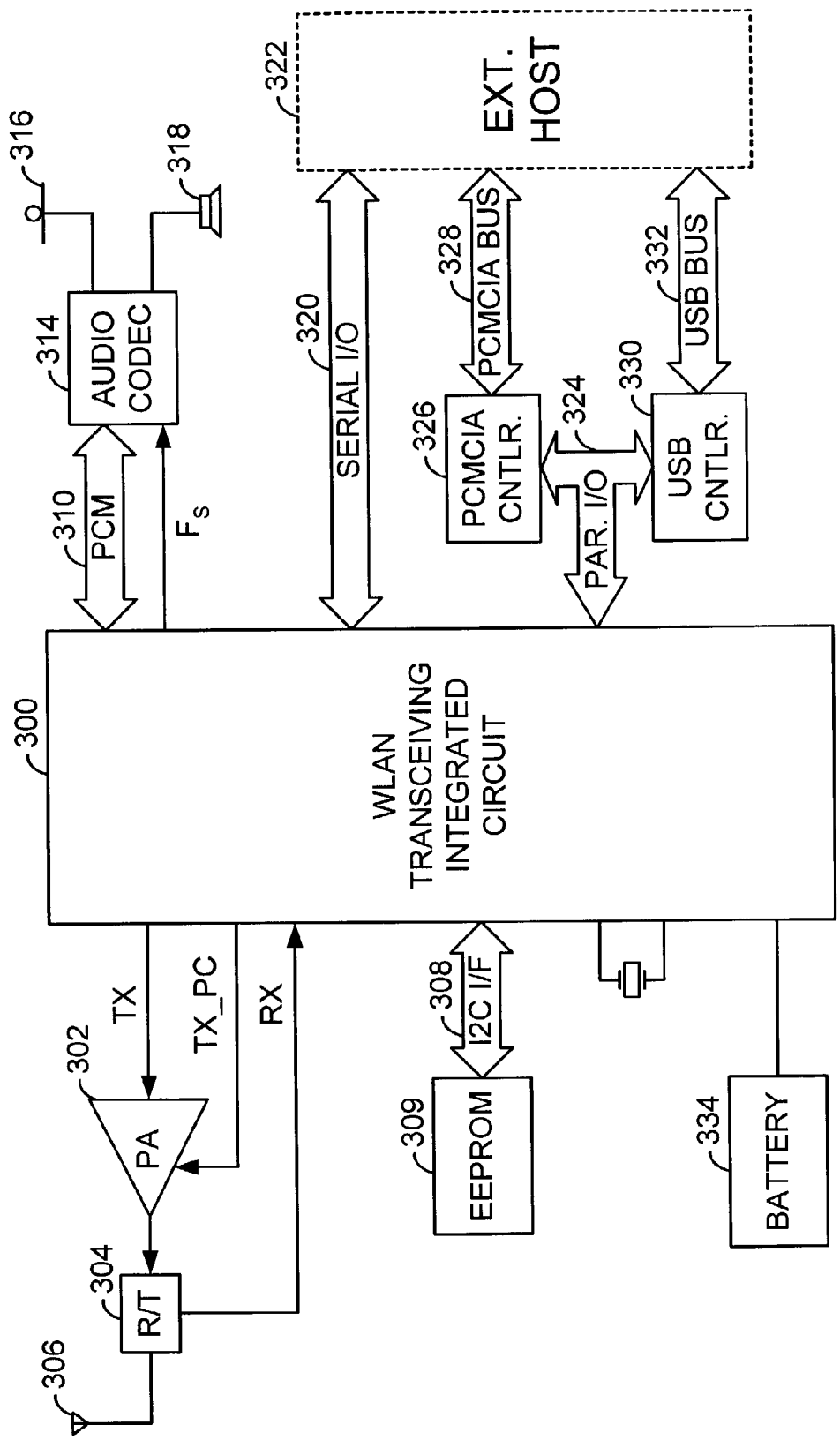
FIG. 3A is a block diagram illustrating the electrical components of a wireless headset that includes a first embodiment of a WLAN transceiving integrated circuit constructed according to the present invention.

FIG. 3A is a block diagram illustrating the electrical components of a wireless headset that includes a first embodiment of a WLAN transceiving integrated circuit constructed according to the present invention. The wireless headset includes the WLAN transceiving integrated circuit 300 and a number of supporting components. The Radio Frequency (RF) interface for the WLAN transceiving integrated circuit 300 includes a Power Amplifier (PA) 302, a Receive/Transmit switch 304, and an antenna 306. The power supply for wireless headset is a battery 334 that couples to the WLAN transceiving integrated circuit 300 and also couples to other components of the wireless headset. The WLAN transceiving integrated circuit 300 includes a plurality of interfaces that adhere to standardized interface formats. These interfaces include an I2C interface 308 that may couple the WLAN transceiving integrated circuit 300 to an EEPROM 309. A Pulse Code Modulated (PCM) connection 310 couples the WLAN transceiving integrated circuit 300 to an audio Coder-Decoder (CODEC) 314 that performs coding/decoding operations. The PCM connection 310 includes a PCM synchronization signal, $F_S$. The audio CODEC 314 couples to a microphone 316 and to a speaker 318.

A serial I/O 320 may couple the WLAN transceiving integrated circuit 300 to an external host 320. However, in the embodiment of FIG. 3, the wireless headset does not require an external host 320. A parallel I/O 324 may couple the WLAN transceiving integrated circuit 300 to a PCMCIA controller 326 and to a USB controller 330 that my also couple the WLAN transceiving integrated circuit 300 to the external host 320 via a PCMCIA bus 328 and a USB bus 332, respectively.

Figure 3B:
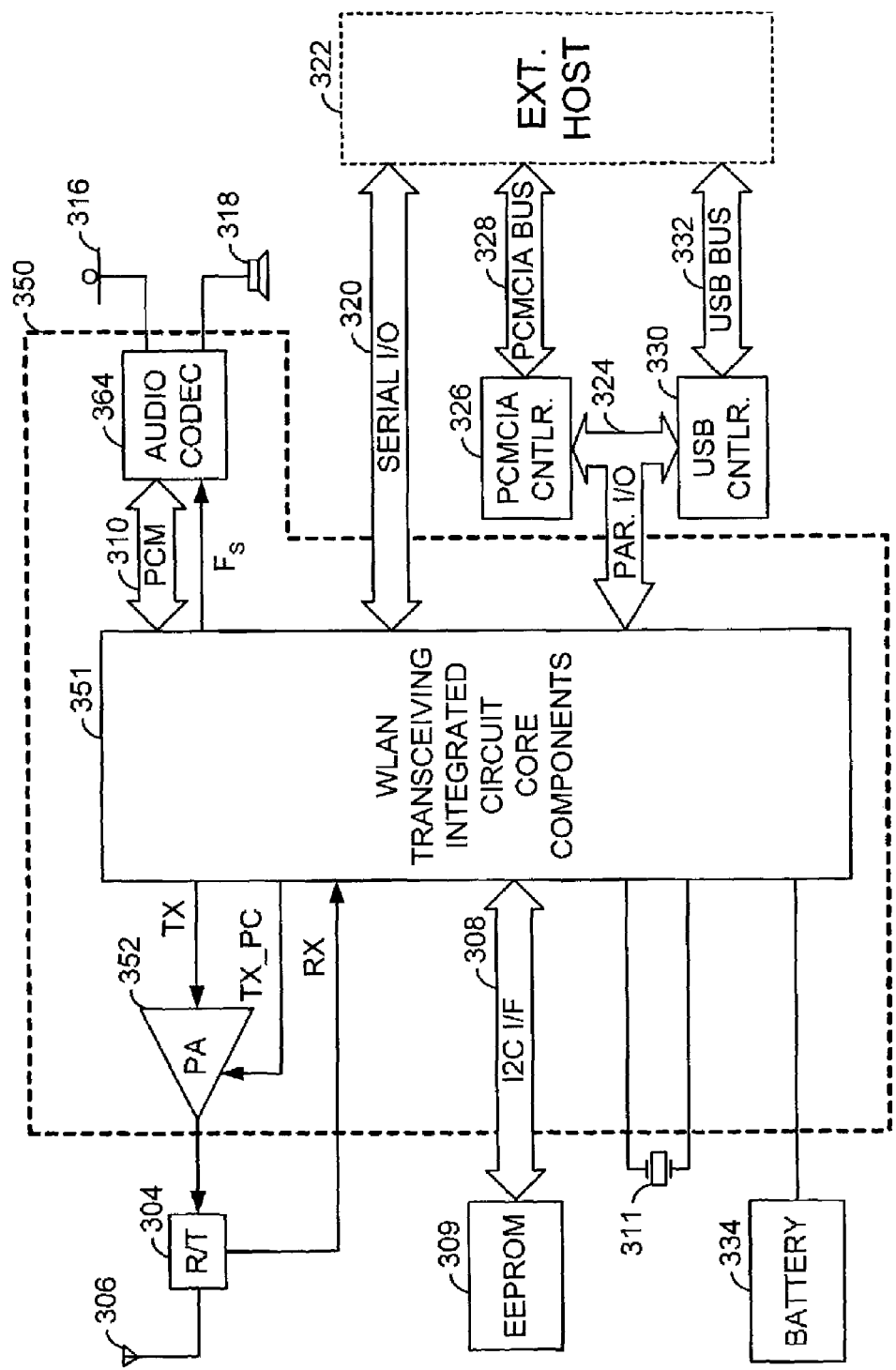
FIG. 3B is a block diagram illustrating the electrical components of a wireless headset that includes a second embodiment of a WLAN transceiving integrated circuit constructed according to the present invention.

FIG. 3B is a block diagram illustrating the electrical components of a wireless headset that includes a second embodiment of a WLAN transceiving integrated circuit constructed according to the present invention. The embodiment of FIG. 3B is similar to the embodiment of FIG. 3A except that the embodiment of FIG. 3B includes additional integration. With such integration, the PA 352 and audio CODEC 364 are on-chip and the remaining components of the WLAN transceiving integrated circuit are referred to as WLAN transceiving integrated circuit core components 351. In still another embodiment, the WLAN transceiving integrated circuit includes an on-chip local oscillator and does not require an external crystal to provide a reference oscillation 311.

Figure 4A:
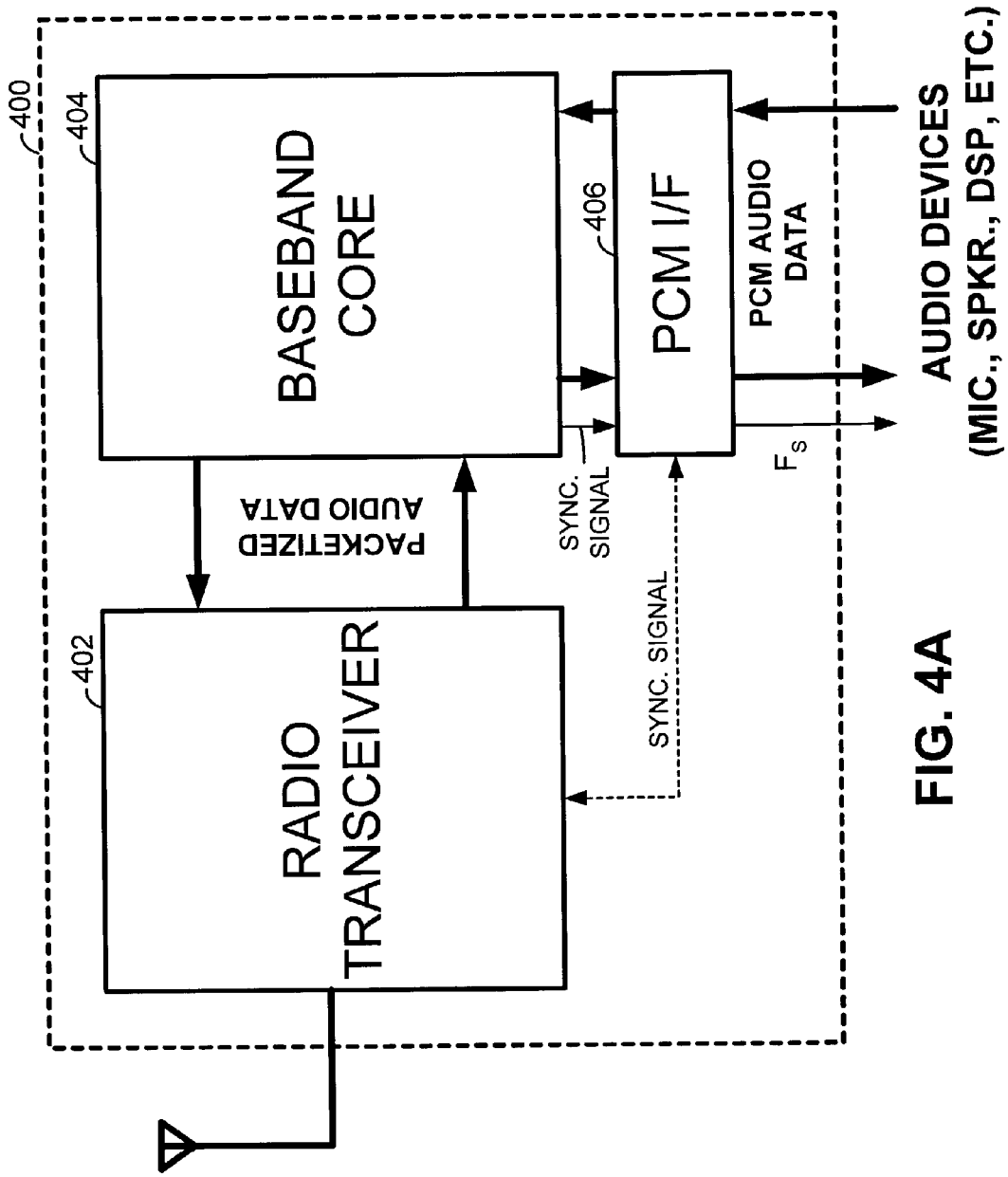
FIG. 4A is a block diagram generally illustrating the components of a WLAN transceiving integrated circuit constructed according to the present invention.

FIG. 4A is a block diagram generally illustrating the components of a WLAN transceiving integrated circuit constructed according to the present invention. The WLAN transceiving integrated circuit 400 includes an integrated radio transceiver 402, a baseband core (BBC) 404, and a PCM interface 406. The integrated radio transceiver 402 of FIG. 4A has been optimized for use in 2.4 GHz Bluetooth wireless systems.

The integrated radio transceiver 402 implements the physical layer of the Bluetooth interface with other Bluetooth enabled WLAN devices. The BBC 404 manages physical channels and links apart from other services like error correction, data whitening, hop selection and Bluetooth security. The BBC 404 implements a Link Controller that works with the link manager for carrying out link level routines like link connection and power control. The BBC 404 also manages asynchronous and synchronous links, handles packets and does paging and inquiry to access and inquire Bluetooth devices in the area. The WLAN transceiving integrated circuit 400 applies a time-division duplex (TDD) scheme (alternate transmit and receive). Therefore apart from different hopping frequency (frequency division), the time is also slotted The BBC 404 supports 13 different packet types for the baseband layer of the Bluetooth system. All higher layers use these packets to compose higher level PDU's. The packets include ID, NULL, POLL, FHS, and DM1packets. These packets are defined for both SCO and ACL links. DH1, AUX1, DM3, DH3, DM5, DH5 packets are defined for ACL links only. HV1, HV2, HV3, and DV packets are defined for SCO links only. Each Bluetooth packet consists of 3 entities, an access code (68/72 bits), a header (54 bits), and a payload (0-2745 bits). The Access code is used for timing synchronization, offset compensation, paging and inquiry. There are three different types of Access codes: (1) the Channel Access Code (CAC); (2) the Device Access Code (DAC); and (3) the Inquiry Access Code (IAC). The channel access code identifies a unique piconet while the DAC is used for paging and its responses. The IAC is used for inquiry purpose. The header contains information for packet acknowledgement, packet numbering for out-of-order packet reordering, flow control, slave address and error check for header. Finally, the Payload contains a voice field, a data field or both. If the payload is a data field, the payload will also contain a payload header. In supporting voice communications, packetized audio data is carried between WLAN devices in Bluetooth Specification Synchronous Connection Oriented (SCO) data packets.

The PCM I/F 406 couples to the baseband core 404 and produces PCM audio data and also a PCM synchronization signal, $F_S$. According to the present invention, the PCM synchronization signal, $F_S$ is temporally aligned with RF slots of the radio transceiver 402 that are produced by a servicing master WLAN device. The PCM I/F 406 may receive the PCM synchronization signal, $F_S$, directly from the baseband core 404 or may construct the PCM synchronization signal, $F_S$, based upon a synchronization signal received from either/both of the radio transceiver 402 or/and the baseband core 404.

Figure 4B:
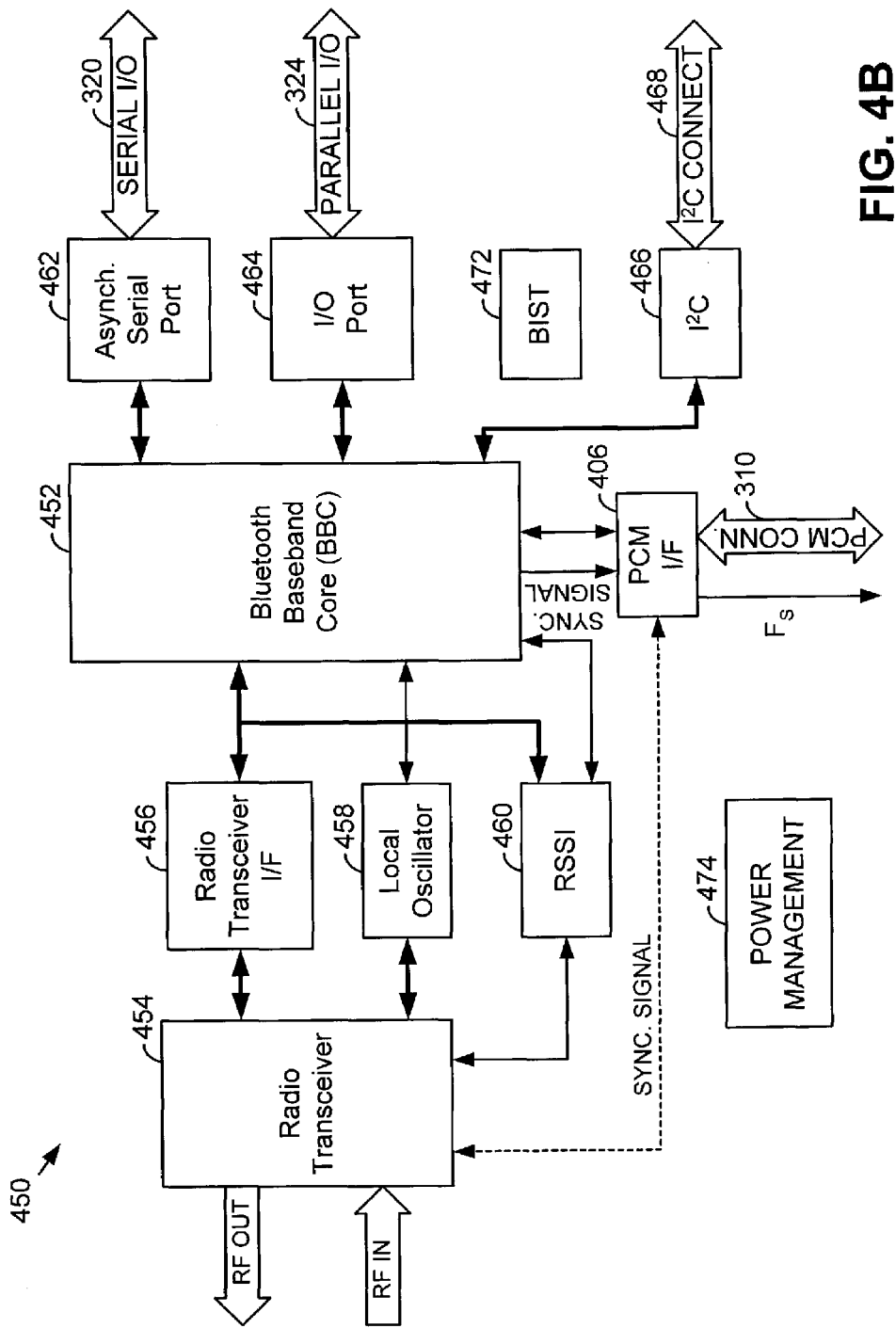
FIG. 4B is a block diagram generally illustrating in more detail the components of the WLAN transceiving integrated circuit constructed according to the present invention of FIG. 4A.

FIG. 4B is a block diagram generally illustrating in more detail the components of the WLAN transceiving integrated circuit 450 constructed according to the present invention of FIG. 4A. The radio transceiver 454 has been designed to provide low-power, low-cost, robust communications for applications operating in the globally available 2.4 GHz unlicensed ISM band. It is fully compliant with the Bluetooth RF specification Version 1.1 and meets or exceeds the requirements to provide the highest communication link quality service. In the receiver path, the radio transceiver 454 has a high-degree of linearity, an extended dynamic range, and high order on-chip channel filtering to ensure reliable operation in the noisy 2.4 GHz ISM band. The performance of the receiver chain is reflected in the IP3, co-channel interference, and out-of-band blocking specifications. The radio transceiver 454 includes a fully integrated transmitter. Baseband data received from the baseband core 404 is GFSK modulated and up-converted to the 2.4 GHz ISM band via an internal mixer. The radio transceiver 454 provides a normal power output of 0 dBm and has a power control signal provided by the WLAN transceiving integrated circuit 300 that controls the PA 302 to provide 24 dBm of gain control in 8 dBm step size.

The radio transceiver 454 interfaces with the BBC 452 via a radio transceiver interface 456, a Local Oscillator (LO) 458, and a Received Signal Strength Indicator (RSSI) 460. The LO 458 provides fast frequency hopping (1600 hops/second) across the 79 maximum available Bluetooth channels. The radio transceiver 454 of the WLAN transceiving integrated circuit 450 features on-chip calibration, eliminating process variation across components. This enables the WLAN transceiving integrated circuit 450 to be used in high volume applications.

The WLAN transceiving integrated circuit 450 parallel I/O interface 324 (coupled to the BBC 452 via an I/O port 464) can be operated in either Master or Slave mode. By default the WLAN transceiving integrated circuit 400 will power up in one of the modes depending on the setting of MODE pins (not shown). In Master mode, the WLAN transceiving integrated circuit 450 accesses peripheral devices on the parallel bus 324 in (1) 8-bit parallel I/O Normal A0 Read and Write modes; and (2) 8-bit parallel I/O Fast ALE Read and Write modes. In Slave mode, the parallel I/O bus interface 464 is intended to support a connection to a wide range of external host processors or external host controllers. Data transfer between an external host 322 and the BBC 452 is provided through transmitter and receiver FIFOs. The external host 322 can program and monitor the FIFO control and status registers. There are also additional external host accessible registers to provide the external host with abilities to dynamically configuring, controlling, and diagnosing the Bluetooth device. The Slave mode interface timing of the parallel bus 324 can be in one of: (1) 8-bit parallel I/O Normal A0 Read and Write modes; (2) 8-bit parallel I/O Fast A0 Read and Write modes; and (3) 8-bit parallel I/O Fast ALE Read and Write modes.

The asynchronous serial interface I/O 320 (coupled to the BBC 452 via an asynchronous serial port 462) enables an asynchronous serial data stream to communicate with the BBC 452 in a similar fashion as the slave mode parallel I/O interface. A programmable baud rate generator is provided to select, transmit and receive clock rates from 9600 bps to 921.6 Kbps. The default baud rate is determined by the setting of external selection pins BAUD[3:0] (not shown).

A master mode 2-wire serial interface bus is available on the WLAN transceiving integrated circuit 450 to allow read and write operations from/to an I2C serial EEPROM 309 via the I2C interface 466 and the I2C connection 468. The BBC 452, via software instruction at power-on reset, sets the control of the I2C pins. At power-on reset the boot code that resides on the BBC 452 on-chip boot ROM monitors a controlled pin to determine the presence or absence of the serial EEPROM 309. If an EEPROM 309 is detected, the BBC 452 on chip boot code performs read operations from the EEPROM 309 that contains the fully operational microcode for the BBC 452. If the EEPROM 309 is not present, the BBC 452 expects the microcode to be downloaded from the external host. When the fully operational microcode is up and running, the external host can access the serial EEPROM 309 through an EEPROM Status and Control register. The BBC 452 implements all the high-level time critical Link Management functions in dedicated hardware under the control of the micro-sequencer. The BBC 452 hardware processes Bluetooth Link Control (LC) functions and manages Bluetooth slot usage. The external host 322 can use this register to manipulate the device pins in order to read and modify the EEPROM 309 contents as desired. The WLAN transceiving integrated circuit further includes power management functions 474 and Built-In-Self Test 472 functions. The power management unit 474 provides power management features that are controlled through setting of the power management registers.

Figure 5:
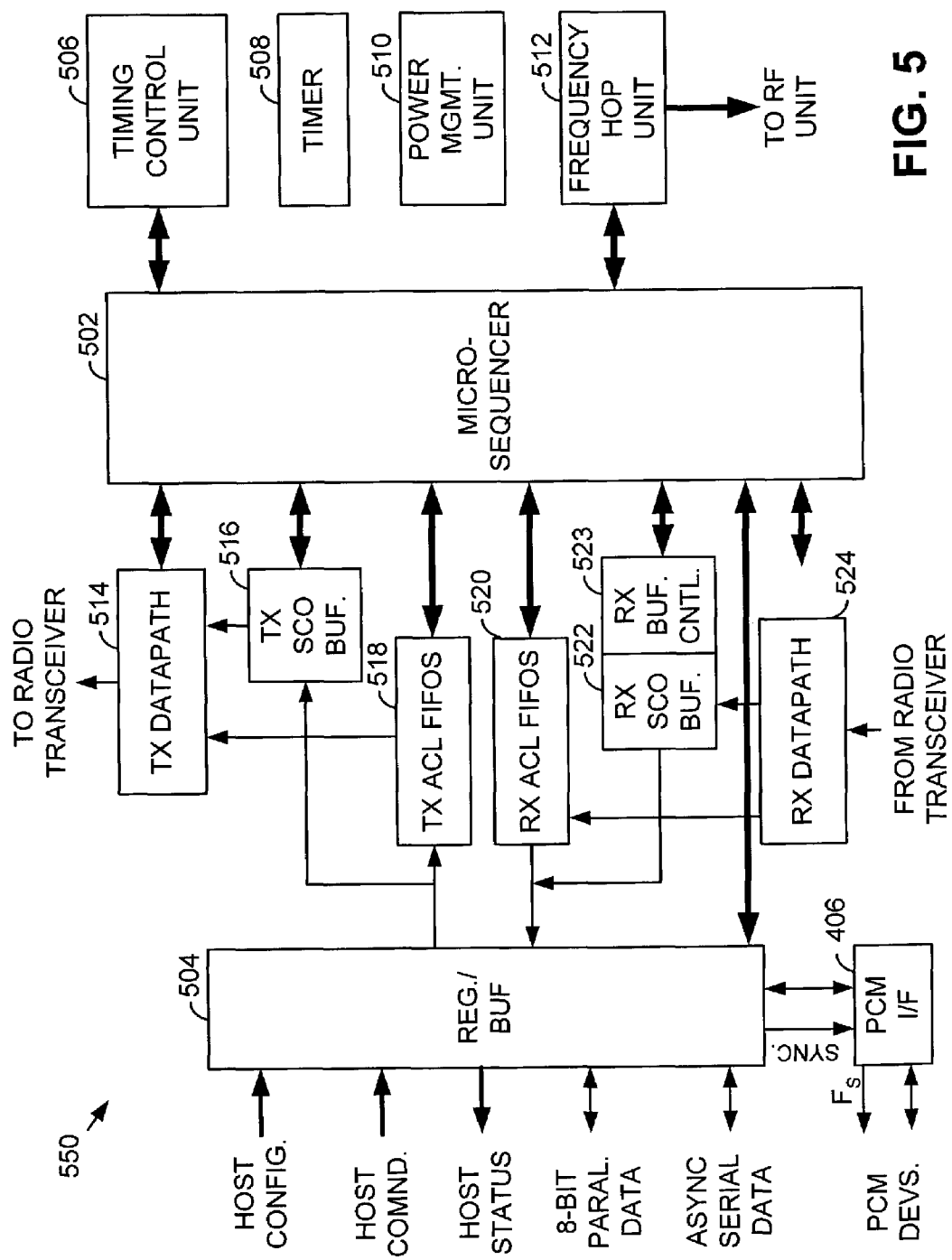
FIG. 5 is a block diagram illustrating the components of a Baseband Core of the WLAN transceiving integrated circuit constructed according to the present invention of FIGS. 4A and 4B.

FIG. 5 is a block diagram illustrating the components of a Baseband Core (BBC) 550 of the WLAN transceiving integrated circuit constructed according to the present invention of FIGS. 4A and 4B. The BBC 550 includes a microsequencer (processor) 502, a timing control unit 506, a timer 508, a power management unit 510, and a frequency hop unit 512. In the transmit path, the BBC 404 includes a TX data path 514 that couples to the radio transceiver, a TX SCO buffer (output buffer) 516, and TX ACL FIFOs 518. In the receive path, the BBC 550 includes an RX data path 524 that couples to the radio transceiver, an RX SCO input buffer 522, and an RX ACL FIFO 520. These components service the receive path for the BBC 550. The registers/buffers 504 receive external host configuration data, external host command data, provide status to the external host, and interface with the external host via the parallel and serial buses. The registers/buffers 504 also interface with the audio CODEC 314 via a PCM interface 406. An input buffer controller 523 operably couples to the input buffer 522 and to the processor 502.

Figure 6:
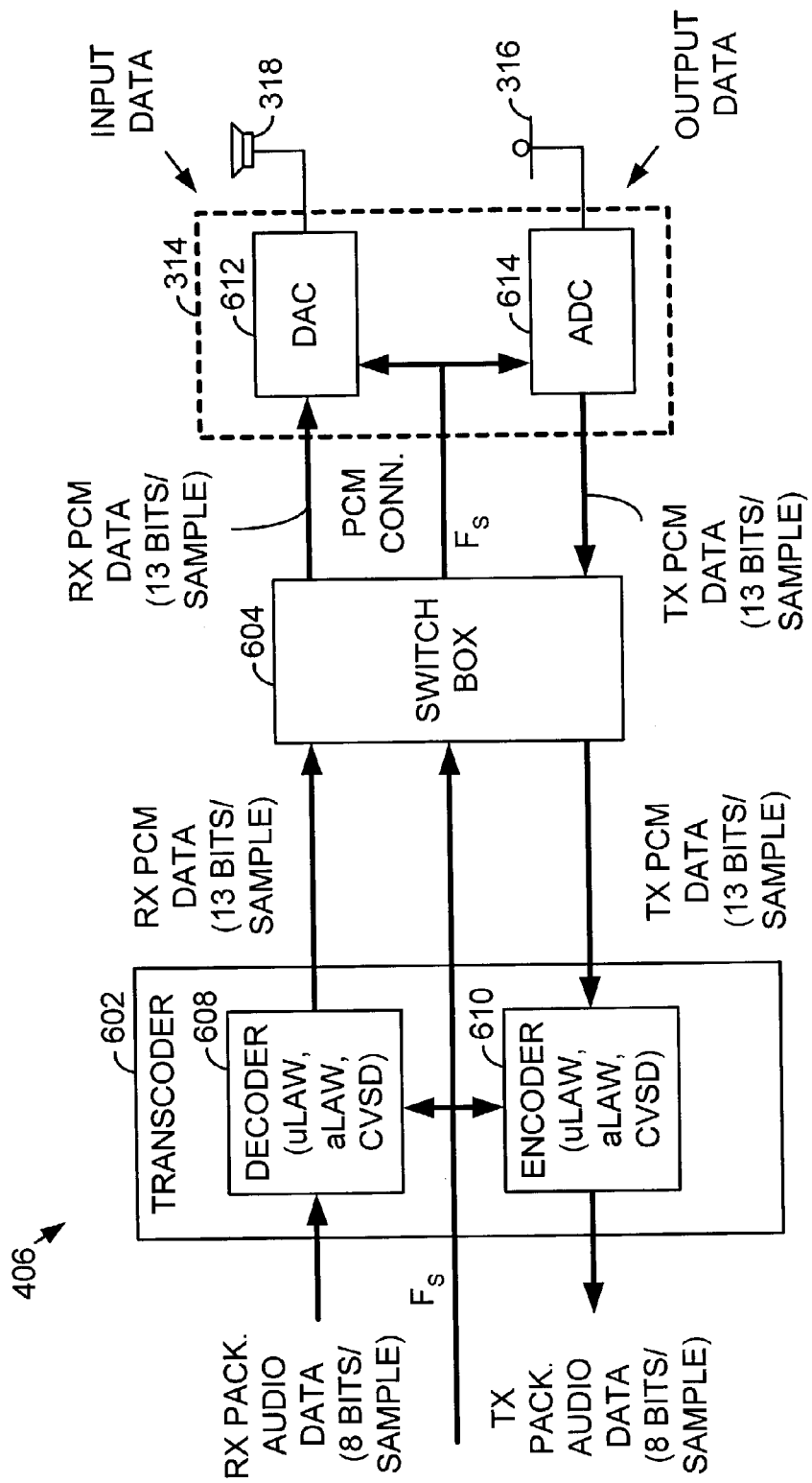
FIG. 6 is a block diagram generally illustrating the components of a Pulse Code Modulated (PCM) interface of the Baseband Core of FIG. 5.

FIG. 6 is a block diagram generally illustrating the components of a Pulse Code Modulated (PCM) interface 406 of the Baseband Core 550 of FIG. 5. The PCM interface 406 includes a transcoder 602 having a decoder 608 and an encoder 610, a switch box 604 and an audio CODEC 314. Coupled to the audio CODEC 314 are a speaker 318 and a microphone 316. As shown, the audio CODEC 314 includes a Digital-to-Analog-Converter (DAC) 614 that converts PCM audio data to an analog audio signal and provides the analog audio signal to a speaker 318. Further, as is shown, the audio CODEC 314 includes an Analog-to-Digital-Converter (ADC) 614 that receives an analog audio signal from the coupled microphone 316 and converts the analog audio signal to PCM audio data.

The transcoder 602 converts packetized audio data (encoded) that is suitable for the WLAN interface to PCM audio data that is suitable for the audio CODEC 314, and vice versa. In particular, the decoder 608 converts encoded packetized audio data to PCM audio data while the encoder 610 converts PCM audio data to encoded packetized audio data. In one embodiment, the transcoder 602 supports 13-bit linear PCM CODEC devices with a 2's complement serial data format. It is capable of supporting an external audio clock or outputting an audio clock (ACLK) in multiples of 128 KHz, from 128 KHz to 4096 KHz. In an audio master mode, the PCM I/F 406 can generate PCM audio data in an 8 KHz short/long Frame Sync (ASYNC) format. In an audio slave mode, the PCM I/F 406 can receive PCM audio data in an 8 KHz short Frame Sync format.

The PCM I/F 406 supports up to three SCO channels, and in at least one embodiment, the PCM audio data is Time Division Multiplexed (TDM) into slots within every ASYNC period. Each of the three SCO channels can be assigned to any TDM slot. The TDM slots can be programmed from one to 16 slots depending on the ACLK rate. In PCM Master mode, and for systems that don't support TDM, the two additional SCO channels are available using GPIO6 and GPIO7 as the PCM Frame Sync signals (i.e., ASYNC3 and ASYNC2, respectively).

The transcoder 602 can process each SCO channel with A-law operations, µ-law operations, or Continuous Variable Slope Delta (CVSD) operations. The appropriate voice-coding scheme is selected after negotiations between the Link Managers of the communicating WLAN devices. On the Bluetooth air-interface, either a 64 kb/s log PCM format (A-law or µ-law) is used, or a 64 kb/s CVSD is used. The latter format applies an adaptive delta modulation algorithm with syllabic companding. The voice coding on the PCM I/F 406 should have a quality equal to or better than the quality of 64 kb/s log PCM. Since the voice channels on the air-interface can support a 64 kb/s information stream, a 64 kb/s log PCM traffic can be used for transmission. Either A-law or µ-law compression can be applied. In the event that the line interface uses A-law and the air interface uses µ-law or vice versa, a conversion from A-law to µ-law is performed. The compression method follows ITU-T recommendations G. 711.

A more robust format for voice over the air interface is a delta modulation. This modulation scheme follows the waveform where the output bits indicate whether the prediction value is smaller or larger then the input waveform. To reduce slope overload effects, syllabic companding is applied: the step size is adapted according to the average signal slope. The input to the encoder 610 (when performing CVSD operations) is 64 kilo-samples/sec linear PCM. An on-chip voice switch box 604 of the PCM I/F 406 provides features such as N-ways conference calling, call forwarding, and call waiting.

In the embodiment of FIG. 6, the PCM I/F 406 receives the PCM synchronization signal, $F_S$, from another component of the WLAN transceiving integrated circuit, e.g., the baseband processor or the WLAN interface. The PCM I/F 406 performs decoding and encoding operations based upon the PCM synchronization signal, $F_S$. Further, the PCM I/F 406 performs switch box operations based upon the PCM synchronization signal, $F_S$, and also provides the signal to the DAC 612 and the ADC 614 that operate according to the PCM synchronization signal, $F_S$. Because the WLAN transceiving integrated circuit operates so that the PCM synchronization signal, $F_S$, is substantially temporally aligned with the RF slots of the WLAN interface, the components of the transcoder 602, the switch box 604, and the audio CODEC 314 will operate in unison with the timing of the servicing master WLAN device to avoid input buffer overflow and underflow operations.

FIG. 7A is a graph illustrating the timing of receipt of packetized audio data by the WLAN interface of the WLAN transceiving integrated circuit of the present invention. As shown, the WLAN interface periodically receives packetized audio data in SCO packets, e.g., packets 702, 704, 706, and 708. The timing of the receipt of the packetized audio data is dependent upon the timing of the WLAN interface. When the WLAN interface communicates with another WLAN device according to the Bluetooth Specification, the timing of receipt of the SCO packets is a function of the master's clock. During normal operations, the SCO packets 702, 704, 706, and 708 are periodically received and written to the input buffer. The operation of FIG. 7A is shown such that the SCO packets are received at regular intervals.

FIGS. 7B through 7D are graphs illustrating the production of PCM synchronization pulses and PCM audio data by the transcoder of the PCM interface of the WLAN transceiving integrated circuit of the present invention. Periodically, based upon the timing of the TDM connection, packetized audio data is written from the input buffer 522 to the transcoder 602. In response, the decoder 608 of the transcoder 602 converts the packetized audio data to PCM audio data and provides the PCM audio data to the DAC 612 of the audio CODEC 314. With a continuous flow of packetized audio data from the input buffer 522 to the transcoder 602, the PCM audio data provides a clean and clear audio signal to the DAC 612 of the audio CODEC 314. Responsively, the DAC 612 of the audio CODEC 314 provides a clean analog audio signal to the speaker 318, which provides a clean audio signal to a user.

As is shown particularly in FIG. 7B, the PCM synchronization pulses, $F_S$, produced by the PCM I/F are temporally aligned with the SCO packets 702, 704, 706, and 708 of FIG. 7A. Further, the PCM data in slot 0 of FIG. 7C and the PCM data in slot 2 of FIG. 7D is also temporally aligned with the SCO packets 702, 704, 706, and 708. When the PCM I/F services multiple PCM "channels", the PCM channels are Time Division Multiplexed (TCM) on the PCM bus as is indicated by FIG. 7D.

Figure 8A:
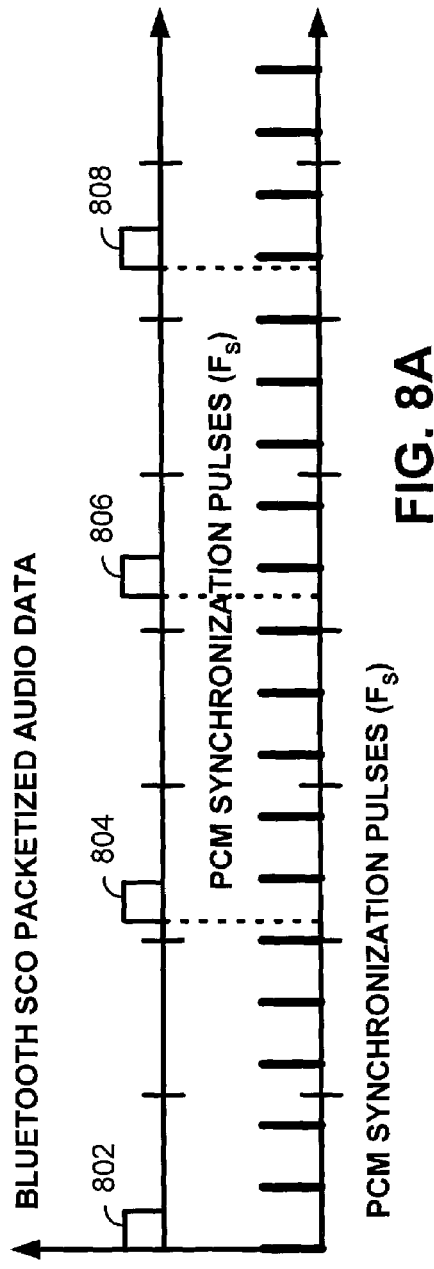
FIG. 8A is a graph illustrating the temporal misalignment between RF slots of the WLAN interface and PCM synchronization pulses, $F_S$, produced by the PCM interface of the WLAN transceiving integrated circuit of the present invention.

FIG. 8A is a graph illustrating the temporal misalignment between RF slots of the WLAN interface and PCM synchronization pulses, $F_S$, produced by the PCM interface of the WLAN transceiving integrated circuit of the present invention. Because the clock reference(s) of the WLAN transceiving integrated circuit differ from those of the WLAN device that transmits to the WLAN device serviced by the WLAN transceiving integrated circuit, over time, temporal drift occurs. Thus, as is shown in FIG. 8A, a temporal misalignment between SCO packets 802, 804, 806, and 808 and the PCM synchronization pulses, $F_S$, develops over time and becomes larger with time.

Figure 8B:
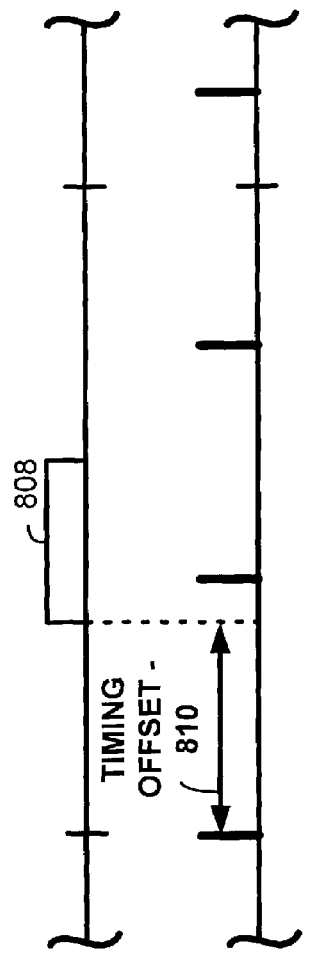
FIG. 8B is a graph illustrating the temporal misalignment between an RF slot of the WLAN interface with PCM synchronization pulses, $F_S$, produced by the PCM interface of the WLAN transceiving integrated circuit of the present invention.

FIG. 8B is a graph illustrating the temporal misalignment between an RF slot of the WLAN interface with PCM synchronization pulses, $F_S$, produced by the PCM interface of the WLAN transceiving integrated circuit of the present invention. A timing offset 810 has developed between a PCM synchronization pulse, $F_S$, and the SCO packets, SCO packet 808 shown, that increases positively with time when the clock of the transmitting WLAN device is faster than the clock of the WLAN device serviced by the WLAN transceiving integrated circuit. Likewise, a timing offset 810 will develop that increases negatively with time if the clock of the transmitting WLAN device is slower than the clock of the WLAN device serviced by the WLAN transceiving integrated circuit. A positive timing offset 810 is shown to develop in FIGS. 8A and 8B.

If the timing offset 810 positively increases with time, the rate at which packetized audio data is read from the input buffer is greater than the rate at which packetized audio data is written to the input buffer. Resultantly, an underflow condition will eventually occur. Likewise, if the timing offset 810 negatively increases with time, the rate at which packetized audio data is read from the input buffer is less than the rate at which packetized audio data is written to the input buffer and an overflow condition will eventually occur. In either case, performance will degrade.

Figure 9:
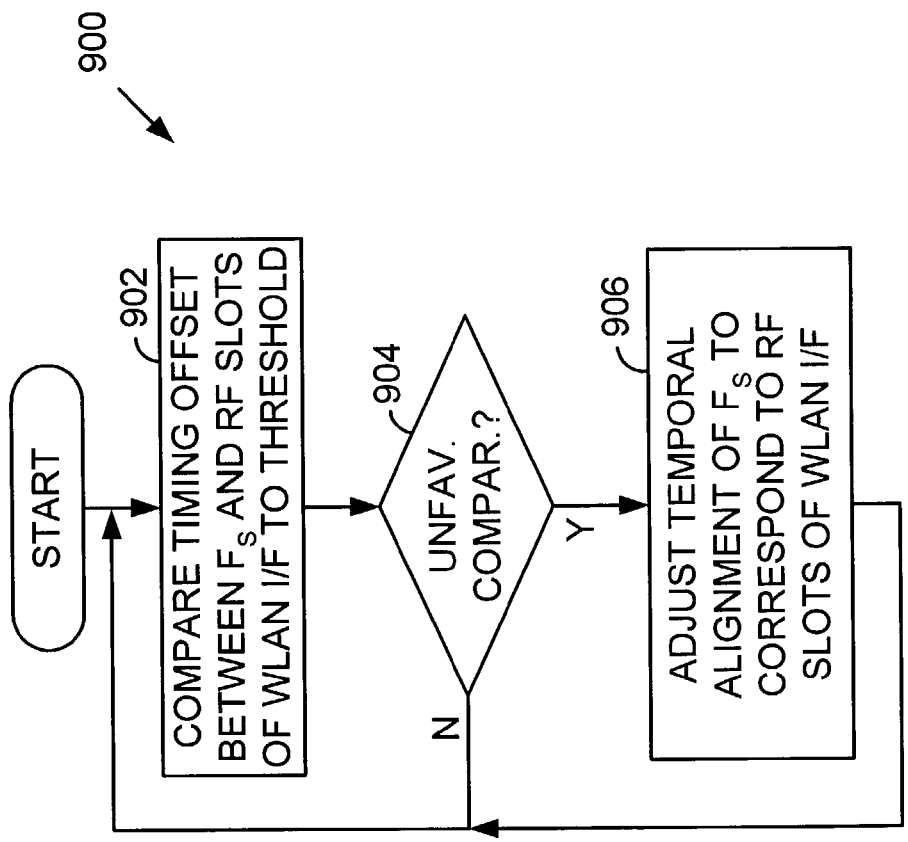
FIG. 9 is a logic diagram illustrating operation according to the present invention in temporally aligning PCM pulses produced by the PCM interface with RF slot of the WLAN interface.

FIG. 9 is a logic diagram illustrating operation according to the present invention in temporally aligning PCM pulses produced by the PCM interface with RF slot of the WLAN interface. Operation commences with the comparison of the timing offset between PCM synchronization pulses, $F_S$, and the RF slots of the WLAN I/F (step 902). If this comparison is not unfavorable (step 904), operation returns to step 902. However, if this comparison is unfavorable (step 904), the temporal alignment of the PCM synchronization pulses, $F_S$, is adjusted to correspond to the RF slots of the WLAN I/F.

Figure 10:
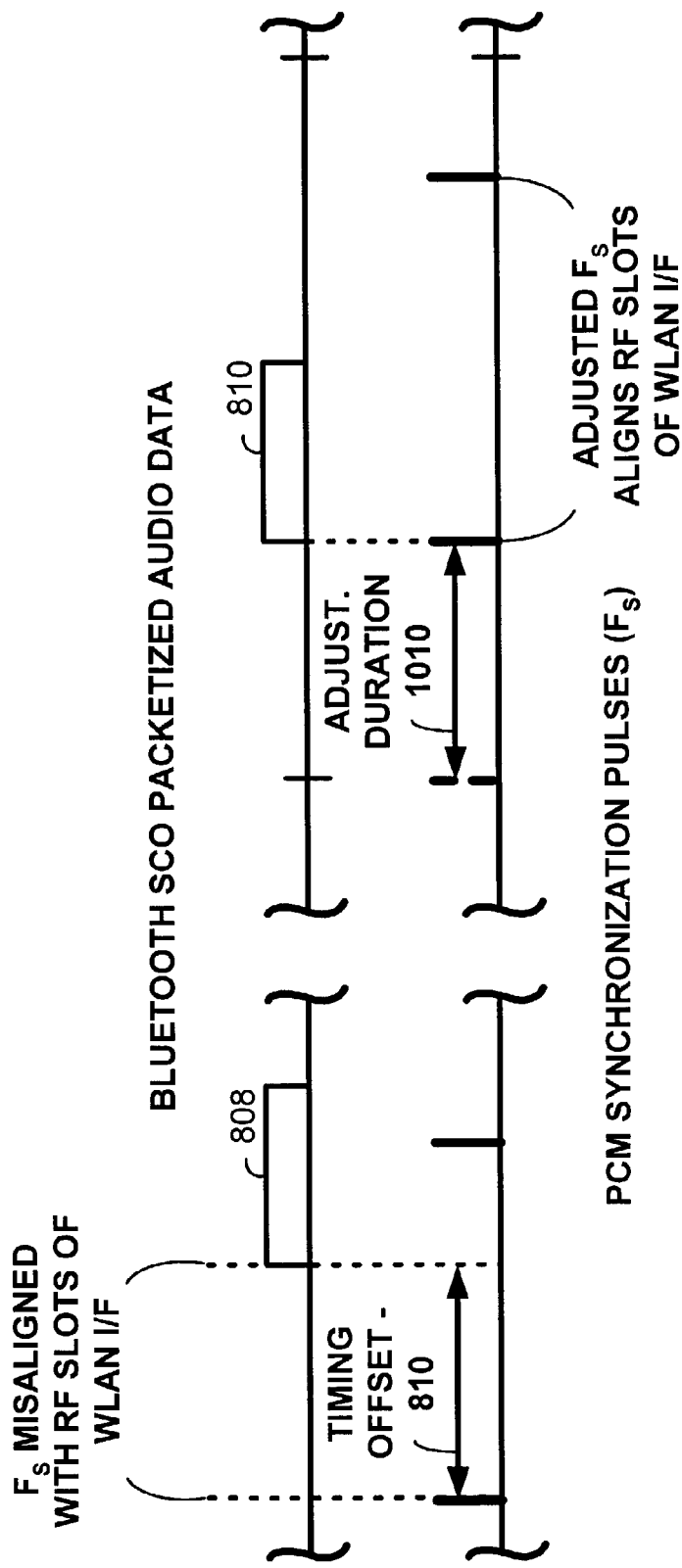
FIG. 10 is a graph illustrating in detail the temporal realignment of PCM synchronization pulses, $F_S$, produced by the PCM interface with RF slots of the WLAN interface according to the present invention.

FIG. 10 is a graph illustrating in detail the temporal realignment of PCM synchronization pulses, $F_S$, produced by the PCM interface with RF slots of the WLAN interface according to the present invention. A first portion of FIG. 10 corresponds to FIG. 8B and illustrates that a timing offset 810 has developed between a PCM synchronization pulse, $F_S$, and SCO packet 808. This timing offset 810 is positive and has been caused because the clock of the transmitting WLAN device is faster than the clock of the WLAN device serviced by the WLAN transceiving integrated circuit.

A second portion of FIG. 10 shows that PCM synchronization pulses, $F_S$, produced by the PCM interface have been temporally realigned by an adjust duration 1010 so that a temporally adjusted PCM synchronization pulses, $F_S$, produced by the PCM interface aligns with SCO packet 810. As should be appreciated by the reader, the temporal realignment of the CM synchronization pulses, $F_S$, produced by the PCM interface will alter the operation of a coupled CODEC. Such alteration in operation alters an analog audio signal produced by the CODEC. However, such alteration is not perceptible by most users.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A Wireless Local Area Network (WLAN) transceiving integrated circuit that services voice communications in a WLAN with at least one WLAN device, the WLAN transceiving integrated circuit comprising:
   a WLAN interface that wirelessly communicates with the at least one WLAN device to receive packetized audio data from the at least one WLAN device;
   an input buffer operably coupled to the WLAN interface that receives the packetized audio data from the WLAN interface;
   a transcoder operably coupled to the input buffer that receives the packetized audio data from the input buffer, that converts the packerized audio data to Pulse Code Modulated (PCM) audio data, and that outputs the PCM audio data to a coupled audio COder/DECoder (CODEC);
   a processor operably coupled to the WLAN interface, the input buffer, and the transcoder; and
   wherein the transcoder outputs the PCM audio data to the audio CODEC such that the PCM audio data is substantially temporally aligned with Radio Frequency (RF) slots of the WLAN interface.

2. The WLAN transceiving integrated circuit of claim 1, wherein the processor controls the timing of the output of the PCM audio data by the transcoder.

3. The WLAN transceiving interrated circuit of claim 2, wherein the processor comprises a micro-sequencer that executes a plurality of microcode software instruction.

4. The WLAN transceiving integrated circuit of claim 1, wherein:
   the processor provides a synchronization signal to the transcoder that is substantially temporally aligned with the RF slots of the WLAN interface; and
   the transcoder uses the synchronization signal to output the PCM audio data so that it is substantially temporally aligned with the RF slots of the WLAN interface.

5. The WLAN transceiving integrated circuit of claim 4, wherein the processor adjusts a timing of the synchronization signal when a timing offset between the synchronization signal and a corresponding RF slot of the WLAN interface compares unfavorably to a timing offset threshold.

6. The WLAN transceiving integrated circuit of claim 4, wherein the synchronization signal comprises PCM synchronization pulses.

7. The WLAN transceiving integrated circuit of claim 1, wherein:
   the WLAN interface provides a synchronization signal to the transcoder that is substantially temporally aligned with the RF slots of the WLAN interface; and
   the transcoder uses the synchronization signal to output the PCM audio data so that the PCM audio data is substantially temporally aligned with the RF slots of the WLAN interface.

8. The WLAN transceiving integrated circuit of claim 1, wherein:
   the transcoder produces a synchronization signal to the coupled audio CODEC that is substantially temporally aligned with the RF slots of the WLAN interface; and
   the transcoder produces the PCM audio data to the coupled audio CODEC such that it is substantially synchronized with the synchronization signal.

9. The WLAN transceiving integrated circuit of claim 1, further comprising:
   a CODEC operably coupled to the transcoder that converts the PCM audio data to analog audio data; and
   a speaker operably coupled to the CODEC that receives the analog audio data and converts the analog audio data to an audio signal that is presented to a user.

10. The WLAN transceiving integrated circuit of claim 1, wherein the packetized audio data is in a Bluetooth Specification data format.

11. The WLAN transceiving integrated circuit of claim 1, wherein the RF slots of the WLAN interface are produced by a WLAN device transmitting to the WLAN transceiving integrated circuit.

12. The WLAN transceiving integrated circuit of claim 11, wherein:
   the WLAN interface supports the Bluetooth Specification; and
   the WLAN device transmitting to the WLAN transceiving integrated circuit is a master Bluetooth device of the WLAN.

13. The WLAN transceiving integrated circuit of claim 1, further comprising:
   a microphone that receives an outbound audio signal from a user and tat converts the outbound audio signal to an outbound analog audio signal;
   an audio CODEC operably coupled to the microphone that converts the outbound analog audio signal to outbound PCM audio data;
   wherein the transcoder operably couples to the audio CODEC and converts the outbound PCM audio data to outbound packetized audio data; and
   an output buffer that operably couples to the transcoder and to the WLAN interface, that receives the outbound packetized audio data from the transcoder, and tat provides the outbound packetized audio data to the WLAN interface.

14. The WLAN transceiving integrated circuit of claim 1, wherein the WLAN interface supports the Bluetooth Specification.

15. A Wireless Local Area Network (WLAN) transceiving integrated circuit that services voice communications in a WLAN with at least one WLAN device, the WLAN transceiving integrated circuit comprising:
   a WLAN interface that wirelessly communicates with the at least one WLAN device to receive packetized audio data from the at least one WLAN device;
   a transcoder operably coupled to the WLAN interface that receives the packetized audio data, that converts the packetized audio data to Pulse Code Modulated (PCM) audio data, and that outputs the PCM audio data to a coupled audio COder/DECoder (CODEC); and
   wherein the transcoder outputs the PCM audio data to the audio CODEC such that the PCM audio data is substantially temporally aligned with Radio Frequency (RF) slots of the WLAN interface.

16. The WLAN transceiving integrated circuit of claim 15, wherein:
   the WLAN interface provides a synchronization signal to the transcoder that is substantially temporally aligned with the RF slots of the WLAN interface; and
   the transcoder uses the synchronization signal to output the PCM audio data so that the PCM audio data is substantially temporally aligned with the RF slots of the WLAN interface.

17. The WLAN transceiving integrated circuit of claim 15, wherein:
   the transcoder produces a synchronization signal to the coupled audio CODEC that is substantially temporally aligned with the RF slots of the WEAN interface; and the transcoder produces the PCM audio data to the coupled audio CODEC such that it is substantially synchronized with the synchronization signal.

18. The WLAN transceiving integrated circuit of claim 15, further comprising:
a CODEC operably coupled to the transcoder that converts the PCM audio data to analog audio data; and
a speaker operably coupled to the CODEC that receives the analog audio data and converts the analog audio data to an audio signal that is presented to a user.

19. The WLAN transceiving integrated circuit of claim 15, wherein the packetized audio data is in a Bluetooth Specification data format.

20. The WLAN transceiving integrated circuit of claim 15, wherein the RF slots of the WLAN interface are produced by a WLAN device transmitting to the WLAN transceiving integrated circuit.

21. The WLAN transceiving integrated circuit of claim 20, wherein:
the WLAN interface supports the Bluetooth Specification; and
the WLAN device transmitting to the WLAN transceiving integrated circuit is a master Bluetooth device of the WLAN.

22. The WLAN transceiving integrated circuit of claim 15, further comprising
a microphone that receives an outbound audio signal from a user and that converts the outbound audio signal to an outbound analog audio signal;
an audio CODEC operably coupled to the microphone that converts the outbound analog audio signal to outbound PCM audio data; and
wherein the transcoder operably couples to the audio CODEC, converts the outbound PCM audio data to outbound packetized audio data, and provides the outbound packetized audio data to the WLAN interface.

23. The WLAN transceiving integrated circuit of claim 15, wherein the WLAN interface supports the Bluetooth Specification.

24. A method for processing packetized audio data by a Wireless Local Area Network (WLAN) device that wirelessly receives the packetized audio data from another WLAN device, the method comprising:
receiving the packetized audio data from the another WLAN device;
converting the packetized audio data to Time Division Multiplexed (TDM) Pulse Code Modulated (PCM) audio data; and
outputting the PCM audio data such that the PCM audio data is substantially temporally aligned with Radio Frequency (RF) slots produced by the another WLAN device.

25. The method of claim 24, further comprising outputting a synchronization signal that is substantially temporally aligned with the RF slots of the another WLAN device.

26. The method of claim 24, further comprising:
outputting a synchronization signal that is substantially temporally aligned with the RF slots of the another WLAN device; and
outputting the PCM audio data such that the PCM audio data is substantially temporally aligned with the synchronization signal.

27. The method of claim 26, wherein the synchronization signal comprises PCM synchronization pulses.

28. The method of claim 24, wherein the packetized audio data is in a Bluetooth Specification data format.

29. The method of claim 24, further comprising:
converting the PCM audio data to analog audio data;
converting the analog audio data to an audio signal; and
presenting the analog audio signal to a user.

30. The method of claim 24, further comprising:
receiving an outbound audio signal from a user;
converting the outbound audio signal to an outbound analog audio signal;
converting the outbound analog audio signal to outbound PCM audio data;
converting the outbound PCM audio data to outbound packetized audio data; and
transmitting the packetized audio data to the another WLAN device.

31. The method of claim 24, further comprising:
outputting a synchronization signal that is substantially temporally aligned with the RF slots of the another WLAN device; and
outputting the PCM audio data such that the PCM audio data is substantially temporally aligned with the synchronization signal; and
adjusting a timing of the synchronization signal when a timing offset between the synchronization signal and a corresponding RF slot of the another WLAN device compares unfavorably to a timing offset threshold.

32. The method of claim 31, wherein the synchronization signal comprises PCM synchronization pulses.

33. The method of claim 24, further comprising:
monitoring a timing offset between the synchronization signal and a corresponding RF slot of the WLAN interface; and
when the timing offset between the synchronization signal and the corresponding RF slot of the WLAN interface compares unfavorably to a timing offset threshold, adjusting the temporal alignment of the synchronization signal.

* * * * *

UNITED STATES PATENT AND TRADEMARK OFFICE
CERTIFICATE OF CORRECTION

| | | |
|---|---|---|
| PATENT NO. | : 7,277,420 B2 | Page 1 of 1 |
| APPLICATION NO. | : 10/293452 | |
| DATED | : October 2, 2007 | |
| INVENTOR(S) | : Vivian Chou et al. | |

It is certified that error appears in the above-identified patent and that said Letters Patent is hereby corrected as shown below:

Column 13, line 27, in Claim 3: replace "interrated" with --integrated--

Column 14, line 21, in Claim 13: replace "tat" with --that--

Column 14, line 32, in Claim 13: replace "tat" with --that--

Column 14, line 67, in Claim 17: replace "WEAN" with --WLAN--

Column 15, line 26, in Claim 22: replace "comprising" with --comprising:--

Signed and Sealed this

Twenty-ninth Day of July, 2008

JON W. DUDAS
*Director of the United States Patent and Trademark Office*